United States Patent
Yip (10) Patent No.: US 11,223,813 B2
(45) Date of Patent: Jan. 11, 2022

(54) METHOD AND APPARATUS FOR GENERATING METADATA FOR 3D IMAGES

(71) Applicant: Samsung Electronics Co., Ltd., Gyeonggi-do (KR)

(72) Inventor: Eric Yip, Seoul (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 15/867,064

(22) Filed: Jan. 10, 2018

(65) Prior Publication Data

US 2018/0199024 A1 Jul. 12, 2018

Related U.S. Application Data

(60) Provisional application No. 62/444,413, filed on Jan. 10, 2017.

(30) Foreign Application Priority Data

Aug. 23, 2017 (KR) .................. 10-2017-0106887

(51) Int. Cl.
| | | |
|---|---|---|
| *H04N 13/178* | (2018.01) | |
| *H04N 13/194* | (2018.01) | |
| *H04N 21/235* | (2011.01) | |
| *H04N 21/81* | (2011.01) | |

(52) U.S. Cl.
CPC ......... *H04N 13/178* (2018.05); *H04N 13/194* (2018.05); *H04N 21/2353* (2013.01); *H04N 21/816* (2013.01)

(58) Field of Classification Search
CPC .... H04N 13/178; H04N 13/194; H04N 19/67; H04N 19/597; H04N 21/2353; H04N 21/816

See application file for complete search history.

(56) References Cited

U.S. PATENT DOCUMENTS

| | | | | |
|---|---|---|---|---|
| 9,912,717 | B2* | 3/2018 | Ha | ........................ G06T 19/006 |
| 10,043,552 | B1* | 8/2018 | Martin | ............... H04N 5/23238 |
| 10,375,375 | B2* | 8/2019 | Hwang | ................ H04N 13/178 |
| 10,666,922 | B2* | 5/2020 | Hwang | ................ H04N 13/178 |
| 10,687,043 | B2* | 6/2020 | Lee | ....................... H04N 19/597 |
| 10,863,225 | B2* | 12/2020 | Hoang | .................... H04L 67/06 |

(Continued)

FOREIGN PATENT DOCUMENTS

| | | |
|---|---|---|
| CN | 102326395 | 1/2012 |
| CN | 105765966 | 7/2016 |

(Continued)

OTHER PUBLICATIONS

International Search Report dated Mar. 29, 2018 issued in counterpart application No. PCT/KR2017/014999, 9 pages.

(Continued)

*Primary Examiner* — Brian P Yenke

(74) *Attorney, Agent, or Firm* — The Farrell Law Firm, P.C.

(57) ABSTRACT

Disclosed are a method and apparatus for generating metadata for a three dimensional (3D) image. The method includes generating metadata for an image rendered to be shaped as a sphere and transmitting the generated metadata, wherein the metadata includes information representing a region of the image.

12 Claims, 7 Drawing Sheets

(56) References Cited

U.S. PATENT DOCUMENTS

| | | | | |
|---|---|---|---|---|
| 10,887,572 | B2* | 1/2021 | Boyce | H04N 13/161 |
| 10,887,577 | B2* | 1/2021 | Oh | H04N 13/161 |
| 10,965,928 | B2* | 3/2021 | Lee | H04N 21/21805 |
| 2006/0221187 | A1* | 10/2006 | Alhadef | G01S 5/0027 348/207.1 |
| 2010/0001997 | A1* | 1/2010 | Kajikawa | G06T 17/20 345/419 |
| 2010/0299630 | A1* | 11/2010 | McCutchen | H04N 7/18 715/803 |
| 2011/0273451 | A1 | 11/2011 | Salemann | |
| 2011/0298795 | A1 | 12/2011 | Van Der Heijden et al. | |
| 2012/0092348 | A1 | 4/2012 | McCutchen | |
| 2013/0106855 | A1* | 5/2013 | Urbach | G06T 15/08 345/424 |
| 2014/0364212 | A1 | 12/2014 | Osman et al. | |
| 2015/0113581 | A1 | 4/2015 | McArdle et al. | |
| 2015/0124049 | A1 | 5/2015 | Kimura | |
| 2015/0181218 | A1* | 6/2015 | Okawa | H04N 19/513 375/240.16 |
| 2015/0256808 | A1 | 9/2015 | MacMillan et al. | |
| 2016/0142697 | A1* | 5/2016 | Budagavi | H04N 19/117 348/43 |
| 2016/0337630 | A1 | 11/2016 | Raghoebardajal et al. | |
| 2017/0201757 | A1* | 7/2017 | Goldman | H04N 19/46 |
| 2017/0280166 | A1* | 9/2017 | Walkingshaw | H04N 19/86 |
| 2017/0345205 | A1* | 11/2017 | Lai | H04N 13/232 |
| 2017/0347026 | A1* | 11/2017 | Hannuksela | H04N 19/00 |
| 2017/0366814 | A1* | 12/2017 | Adsumilli | H04N 5/23238 |
| 2018/0020238 | A1* | 1/2018 | Liu | H04N 19/107 |
| 2018/0061002 | A1* | 3/2018 | Lee | H04N 19/88 |
| 2018/0063505 | A1* | 3/2018 | Lee | H04N 13/106 |
| 2018/0075635 | A1* | 3/2018 | Choi | H04N 13/204 |
| 2018/0091735 | A1* | 3/2018 | Wang | H04N 19/597 |
| 2018/0160123 | A1* | 6/2018 | Van Der Auwera | H04N 19/167 |
| 2018/0160132 | A1* | 6/2018 | Hendry | H04N 19/187 |
| 2018/0160160 | A1* | 6/2018 | Swaminathan | H04N 21/2662 |
| 2018/0161002 | A1* | 6/2018 | Alford | A61B 8/4236 |
| 2018/0176468 | A1* | 6/2018 | Wang | H04N 19/46 |
| 2018/0192001 | A1* | 7/2018 | Boyce | H04N 19/597 |
| 2018/0199042 | A1* | 7/2018 | Wang | H04N 21/44008 |
| 2018/0199075 | A1* | 7/2018 | Wang | H04N 21/23439 |
| 2018/0232851 | A1 | 8/2018 | Scholl et al. | |
| 2018/0276890 | A1* | 9/2018 | Wang | H04N 21/4728 |
| 2018/0332265 | A1* | 11/2018 | Hwang | H04N 21/8451 |
| 2018/0374192 | A1* | 12/2018 | Kunkel | G06T 15/205 |
| 2019/0012839 | A1* | 1/2019 | Wang | G06T 19/006 |
| 2019/0141311 | A1* | 5/2019 | Lee | H04N 13/194 |
| 2019/0174116 | A1* | 6/2019 | Oh | H04N 13/178 |
| 2019/0199995 | A1* | 6/2019 | Yip | H04N 13/161 |
| 2019/0238860 | A1* | 8/2019 | Lim | H04N 21/23439 |
| 2019/0253734 | A1* | 8/2019 | Lee | H04L 65/601 |
| 2019/0306515 | A1* | 10/2019 | Shima | H04N 19/70 |
| 2019/0320157 | A1* | 10/2019 | Hwang | H04N 19/70 |
| 2019/0356899 | A1* | 11/2019 | Oh | H04N 5/23238 |
| 2019/0370876 | A1* | 12/2019 | Greenberger | G06Q 30/0623 |
| 2019/0373245 | A1* | 12/2019 | Lee | H04N 21/234345 |
| 2019/0379876 | A1* | 12/2019 | Hur | H04N 21/4728 |
| 2020/0053282 | A1* | 2/2020 | Wang | H04N 21/816 |
| 2020/0107007 | A1* | 4/2020 | Yip | H04N 21/816 |
| 2020/0107009 | A1* | 4/2020 | Hwang | H04N 19/70 |
| 2020/0186833 | A1* | 6/2020 | Oh | H04N 19/597 |
| 2020/0204785 | A1* | 6/2020 | Lee | H04N 21/23614 |
| 2020/0322586 | A1* | 10/2020 | Lee | H04N 21/23614 |
| 2020/0351449 | A1* | 11/2020 | Oh | H04L 67/38 |
| 2020/0389640 | A1* | 12/2020 | Lee | H04N 13/117 |

FOREIGN PATENT DOCUMENTS

| | | |
|---|---|---|
| JP | 2015-156523 | 8/2015 |
| JP | 2016-532178 | 10/2016 |
| WO | WO 2015/197815 | 12/2015 |

OTHER PUBLICATIONS

Chinese Office Action dated Jun. 28, 2020 issued in counterpart application No. 201780082297.2, 15 pages.

TNO, "Projection-independent ROI Signalling for Spherical Content", ISO/IEC JTC1/SC29/WG11, Coding of Moviing pictures and Audio, Oct. 12, 2016, 4 pages.

European Search Report dated Nov. 28, 2019 issued in counterpart application No. 17891896.7-1209, 8 pages.

Input Document, "Spherical Viewport SEI for HEVC and AVC 360 Video", JCTVC-Z0034, Joint Collaborative Team on Video Coding, Jan. 5, 2017, 5 pages.

European Search Report dated Mar. 29, 2021 issued in counterpart application No. 17891896.7-1209, 10 pages.

Korean Office Action dated May 21, 2021 issued in counterpart application No. 10-2017-0106887, 9 pages.

\* cited by examiner

METHOD AND APPARATUS FOR GENERATING METADATA FOR 3D IMAGES

PRIORITY

This application claims priority under 35 U.S.C. § 119(a) to U.S. Provisional Patent Application No. 62/444,413 filed in the United States Patent and Trademark Office on Jan. 10, 2017, and to Korean Patent Application No. 10-2017-0106887 filed in the Korean Intellectual Property Office on Aug. 23, 2017, the disclosures of which are incorporated herein by reference.

BACKGROUND

1. Field of the Disclosure

The present disclosure relates generally to methods and apparatuses for generating metadata for three-dimensional (3D) images.

2. Description of the Related Art

The Internet is evolving from a human-centered connection network, where humans create and consume information, to an Internet of things (IoT) network, where information is communicated and processed between things or other distributed components. Internet of everything (IoE) technology is an example of a combination of big data processing technology and IoT technology through a connection with a cloud server.

To implement the IoT, technology elements, such as a sensing technology, a wired/wireless communication technology, a service interface technology, and a security technology, are required. There is recent ongoing research for inter-object connection technologies, such as sensor network technology, machine-to-machine (M2M) technology, or machine-type communication (MTC) technology.

The IoT environment may provide intelligent internet technology (IT) services that collect and analyze data generated by devices connected with one another to create a new value for human life. The IoT may have various applications, such as smart home applications, smart building applications, smart city applications, smart car applications, connected car applications, smart grid applications, healthcare applications, smart appliance industry applications, or state-of-the-art medical services, through conversion or integration of existing IT technologies and various industries.

Meanwhile, content for implementing the IoT is also evolving. As black-and-white content shifts to color content, and high definition (HD), ultra-high definition (UHD), and recent high dynamic range (HDR) content are standardized and spread, research is underway for virtual reality (VR) content that may be played by VR apparatuses, such as the Oculus™ or Samsung Gear™ VR. VR systems monitor a user and allow the user to enter feedback through a content display device, or processing unit, using a certain type of controller. The device, or unit, processes the entered feedback to adjust the content to fit the same, enabling interactions.

A VR echo system may include basic components, such as a head mounted display (HMD), wireless/mobile VR, TVs, cave automatic virtual environments (CAVEs), peripherals, haptics (e.g., other controllers for providing inputs to the VR), a content capture (e.g., camera or video stitching), a content studio (e.g., game, stream, movie, news, and documentary), industrial applications (e.g., education applications, healthcare applications, real property applications, construction applications, and travel applications), productive tools and services (e.g., 3D engines and processing power), and an app store for VR media content.

3D images played on VR devices may be stereoscopic images, such as spherical or cylindrical images. VR devices may display particular regions of 3D images considering the direction of the user's gaze.

Metadata regarding a 3D image, along or independently from the 3D image, may be transmitted. The metadata may contain various pieces of information regarding the 3D image. To instruct a VR device to display a particular region of the 3D image, information for identifying the particular region may need to be transmitted to the VR device. The information for identifying the particular region may be transmitted in the metadata.

SUMMARY

The present disclosure has been made to address at least the above problems and/or disadvantages and to provide at least the advantages described below. Accordingly, an object of the present disclosure is to provide a method and apparatus for generating metadata capable of specifying a region of a 3D image in an efficient manner.

According to an aspect of the present disclosure, a method for generating metadata for a 3D image comprises generating metadata for an image rendered to be shaped as a sphere and transmitting the generated metadata, wherein the metadata includes information representing a region of the image.

According to another aspect of the present disclosure, an apparatus for generating metadata for a 3D image comprises a communication interface and a processor connected with the communication interface, wherein the processor is configured to generate metadata for an image rendered to be shaped as a sphere and transmit the generated metadata, and the metadata includes information representing a region of the image.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

Although the terms "first" and "second" are used to describe various components, the components are not limited by the terms. These terms are provided simply to distinguish one component from another. Accordingly, the first component mentioned herein may also be the second component within the technical spirit of the present disclosure.

Figure 1:
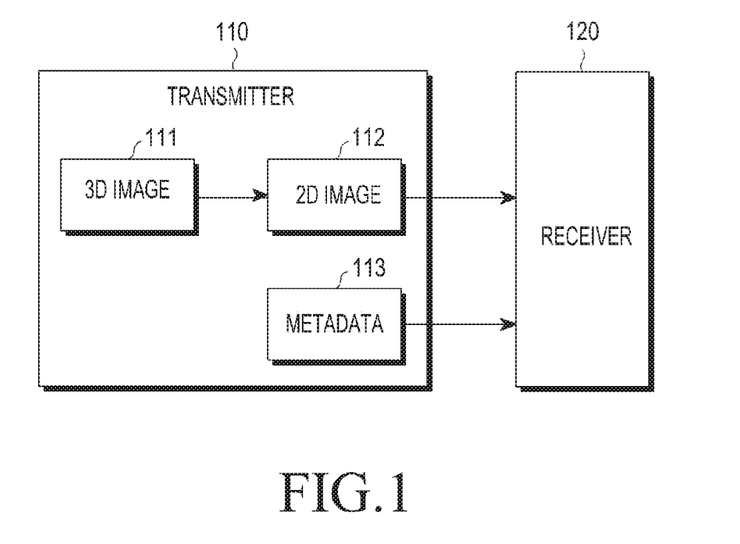
FIG. 1 is a block diagram illustrating a system for transmitting and receiving data regarding a 3D image, according to an embodiment of the present disclosure.

FIG. 1 is a block diagram illustrating a system for transmitting and receiving data regarding a 3D image, according to an embodiment of the present disclosure. The system of FIG. 1 includes a transmitter 110 and a receiver 120.

The transmitter 110 may be a server for providing 3D image-related services. The transmitter 110 may convert a 3D image 111 into a two-dimensional (2D) image 112. The 3D image 111 may be a static image or dynamic image (i.e., a video). The term "3D image" may mean, or be replaced with, an omni-directional image. Content containing the 3D image (or omni-directional image) may be referred to as 3D media or omni-directional media. The transmitter 110 may use equirectangular projection (ERP) to convert the 3D image 111 into the 2D image 112 but is not limited thereto. For example, the transmitter 110 may also adopt other various known schemes, such as octahedron projection. Where the 3D image 111 is a dynamic image, the transmitter 110 may convert each frame of the 3D image 111 into a 2D frame, generating the 2D image 112 that is a dynamic image. The generated 2D image 112 may be transmitted to the receiver 120 as per a protocol known to transmit 2D images, as defined in the moving picture experts group (MPEG) standards.

The transmitter 110 may generate metadata 113 about the 3D image 111 and transmit the metadata 113 to the receiver 120. The metadata 113 may contain various pieces of information related to the 3D image 111. The metadata 113 may be used to play the 3D image on the receiver 120. The transmitter 110 may transmit the metadata 113 separately from transmitting the data of the 3D image 111 (i.e., the data of the converted 2D image 112). In an embodiment of the present disclosure, an entity transmitting the data of the 3D image may differ from another entity transmitting the metadata.

The metadata 113 may contain information indicating a particular region of the 3D image 11. The particular region indicated by information contained in the metadata 113 may be a region corresponding to a viewport when the receiver 120 displays the 3D image 111 or a region including a viewport and an additional guard region. The particular region may be set as per various needs and may be referred to as a region of interest (ROI).

The receiver 120 may be a virtual reality (VR) device (e.g., an HMD-type VR device) for providing VR content. The receiver 120 may receive the converted 2D image 112 and metadata 113. The receiver 120 may restore the 3D image from the converted 2D image 112 received and may play the 3D image based on the metadata 113. In an embodiment of the present disclosure, after receiving the metadata 113 including information indicating the particular region of the 3D image 110, the receiver 120 may retrieve, from the transmitter 110, only data corresponding to the particular region, but not the overall region of the 3D image 110.

A method for specifying a region of a 3D image with information included in metadata is described next.

Figure 2:
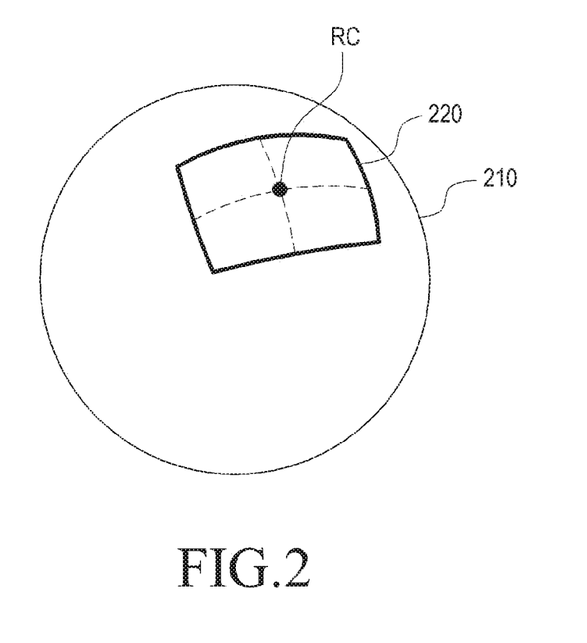
FIGS. 2 and 3 illustrate a method for representing a partial region of a 3D image, according to an embodiment of the present disclosure.
Figure 3:
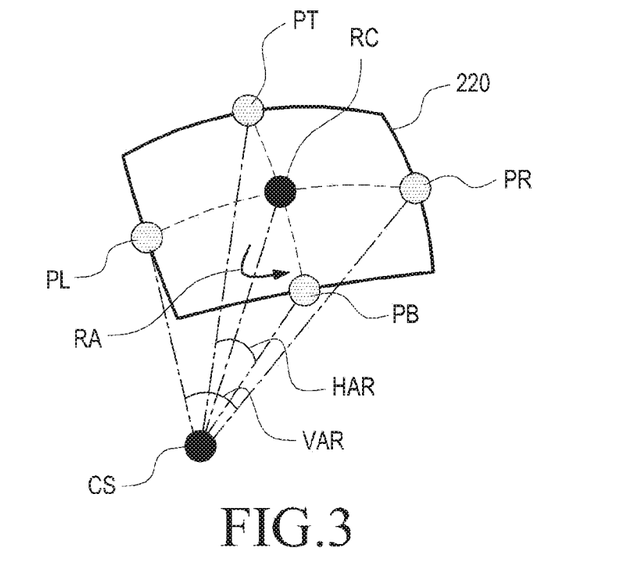

FIGS. 2 and 3 illustrate a method for representing a partial region of a 3D image, according to an embodiment of the present disclosure.

Referring to FIGS. 2 and 3, a 3D image 210 may be shaped as a sphere. The spherical 3D image 210 may be referred to as a 3D image rendered to have a spherical shape. A region (hereinafter, an ROI) 220 may be a partial region of the 3D image 210. The ROI 220 may correspond to a viewport and may be a region that may be displayed on a rectangular display for playing the 3D image. In such case, the ROI 220 may be bordered by four edges that are constituted of parts of four great circles. The ROI 220 may be specified by the coordinates of the center RC of the ROI 220, the coordinates of the middle of the upper edge, the coordinates of the middle PB of the lower edge, the coordinates of the middle PL of the left edge, and the coordinates of the middle PR of the right edge. The coordinates on the spherical 3D image may be represented with the yaw and pitch values of the sphere coordinate system having the center of the sphere as its original point.

The coordinates of the middle PT of the upper edge of the ROI 220 and the coordinates of the middle PB of the lower edge may be obtained from the coordinates of the center RC of the ROI 220, the roll RA value at the center of the ROI 220 that indicates the orientation angle RA of the ROI 220, and the vertical angular range VAR of the ROI 220 that indicates an angular range of the middle PT of the upper edge and the middle PB of the lower edge with respect to the center CS of the sphere, as an apex. The arc connecting the middle PT of the upper edge with the middle PB of the lower edge is part of the great circle of the sphere. Accordingly, the distance between the middle PT of the upper edge and the middle PB of the lower edge on the 3D image may be represented as the product of the radius of the sphere and the VAR.

Likewise, the coordinates of the middle PL of the left edge of the ROI 220 and the coordinates of the middle PR of the right edge may be obtained from the coordinates of the center RC of the ROI 220, the roll RA value at the center of the ROI 220 and the horizontal angular range (HAR) of the ROI 220 that indicates an angular range of the middle PL of the left edge and the middle PR of the right edge with respect to the center CS of the sphere, as an apex. The arc connecting the middle PL of the left edge with the middle PR of the right edge is part of the great circle of the sphere. Accordingly, the distance between the middle PL of the left edge and the middle PR of the right edge on the 3D image may be represented as the product of the radius of the sphere and the HAR.

Thus, the transmitter 110 may specify the ROI 220 by transmitting metadata including the yaw, pitch, and roll values of the center RC of the ROI 220, the HAR, and the VAR as information for specifying the particular region. In such case, the receiver 120 needs to be aware that the ROI is defined by the four great circles. The receiver 120 may be aware that the ROI is defined with the four great circles implicitly or by explicit signaling from the transmitter 110.

As mentioned above, since the ROI 220 corresponds to a viewport, the embodiments of FIGS. 2 and 3 may be useful for designating the particular region of the 3D image as a viewport.

Figure 4:
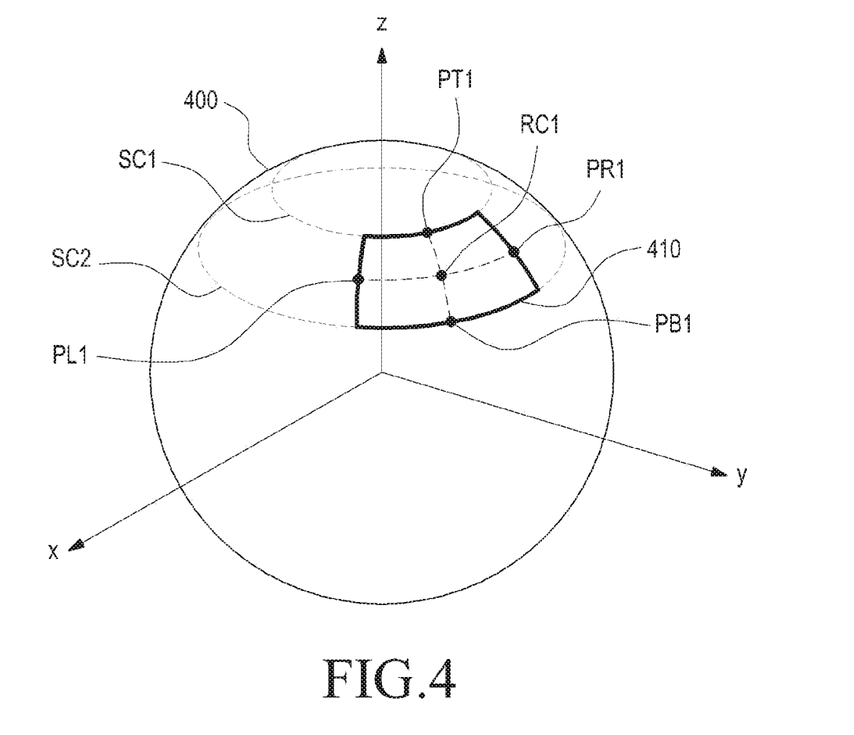
FIGS. 4 and 5 illustrate a partial region of a 3D image, according to an embodiment of the present disclosure.
Figure 5:
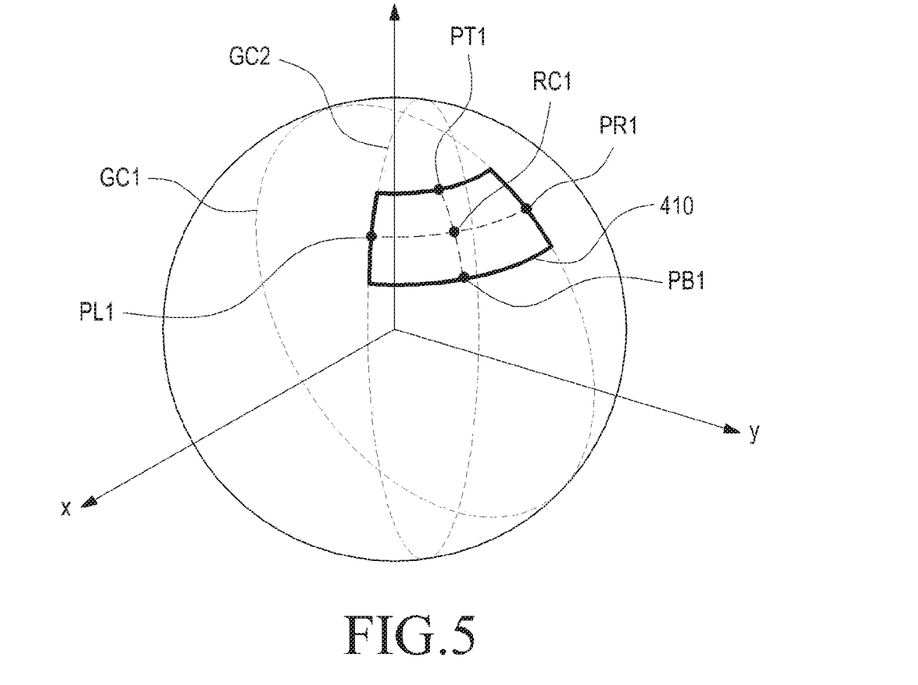

FIGS. 4 and 5 illustrate a partial region of a 3D image, according to an embodiment of the present disclosure.

Referring to FIGS. 4 and 5, an ROI 410 may be defined as a region surrounded by two small circles that are perpendicular to the z axis of the sphere 400 of a spherical 3D image 400 and two great circles GC1 and GC2 traversing the z axis. The two small circles SC1 and SC2 perpendicular to the z axis may be referred to as yaw circles, and the two great circles GC1 and GC2 traversing the z axis may be referred to as pitch circles. The angle of the middle PL1 of the left edge of the ROI 410 and the middle PR1 of the right edge with respect to the center of the sphere may be referred to as an apex as a horizontal angular range of the ROI 410. The horizontal angular range may be an angle formed as the two planes each including a respective one of the two great circles GC1 and GC2 traversing the z axis cross each other. The angle of the middle PT1 of the upper edge of the ROI 410 and the middle PB1 of the lower edge with respect to the center of the sphere, as an apex, may be referred to as a VAR of the ROI 410. The VAR may be a difference in latitude between the two small circles SC1 and SC2.

The transmitter 110 may specify the ROI 410 with the metadata containing the coordinates (i.e., the yaw and pitch) of the center RC1 of the ROI 410, the VAR, and the HAR, as information for specifying the region. In this case, the receiver 120 needs to be aware that the ROI 410 is defined as a region surrounded by the two small circles SC1 and SC2 perpendicular to the z axis and the two great circles GC1 and GC2 traversing the z axis. The receiver 120 needs to be aware, implicitly or via explicit signaling from the transmitter 110, that the ROI 410 is defined as a region surrounded by the two small circles SC1 and SC2 perpendicular to the z axis and the two great circles GC1 and GC2 traversing the z axis.

Upon conversion into a 2D image, the ROI 410 may correspond to a rectangular region of the 2D image. Accordingly, the embodiments of FIGS. 4 and 5 may easily specify a region on a 2D image corresponding to a region specified by information contained in metadata and may thus be useful for transmission of only image data regarding the specified region.

Figure 6:
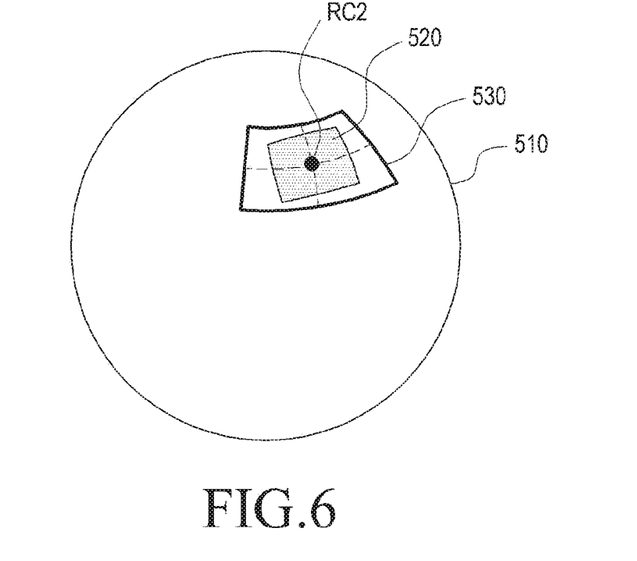
FIG. 6 illustrates a partial region of a 3D image, according to an embodiment of the present disclosure.

FIG. 6 illustrates a partial region of a 3D image, according to an embodiment of the present disclosure. Metadata may include both information indicating a first ROI 520 of a spherical 3D image and information indicating a second ROI 530 of the spherical 3D image. The first ROI 520 is a region that may be defined with four great circles as set forth above in connection with FIGS. 2 and 3. Accordingly, information indicating the first ROI 520 may include the yaw, pitch, and roll of the center RC2 of the first ROI 520 and the HAR and VAR of the first ROI 520. The second ROI 530 may be defined with two small circles perpendicular to the z axis and two great circles traversing the z axis as set forth above in connection with FIGS. 4 and 5. Accordingly, information indicating the second ROI 530 may include the coordinates (i.e., yaw and pitch) of the center RC2 of the second ROI 530 and the VAR and HAR of the second ROI 530. Although FIG. 6 illustrates that the first ROI 520 and the second ROI 530 have the same center RC2, this is merely an example, and they are not necessarily the same.

The first ROI 520 may correspond to a viewport. The second ROI 530 may cover a viewport and may include a guard region other than the viewport. Upon receiving metadata containing the information indicating the first ROI 520 and the second ROI 530, the receiver 120 may retrieve image information corresponding to the second ROI 530 from the transmitter 110 or a server and play the region corresponding to the first ROI 520.

Figure 7:
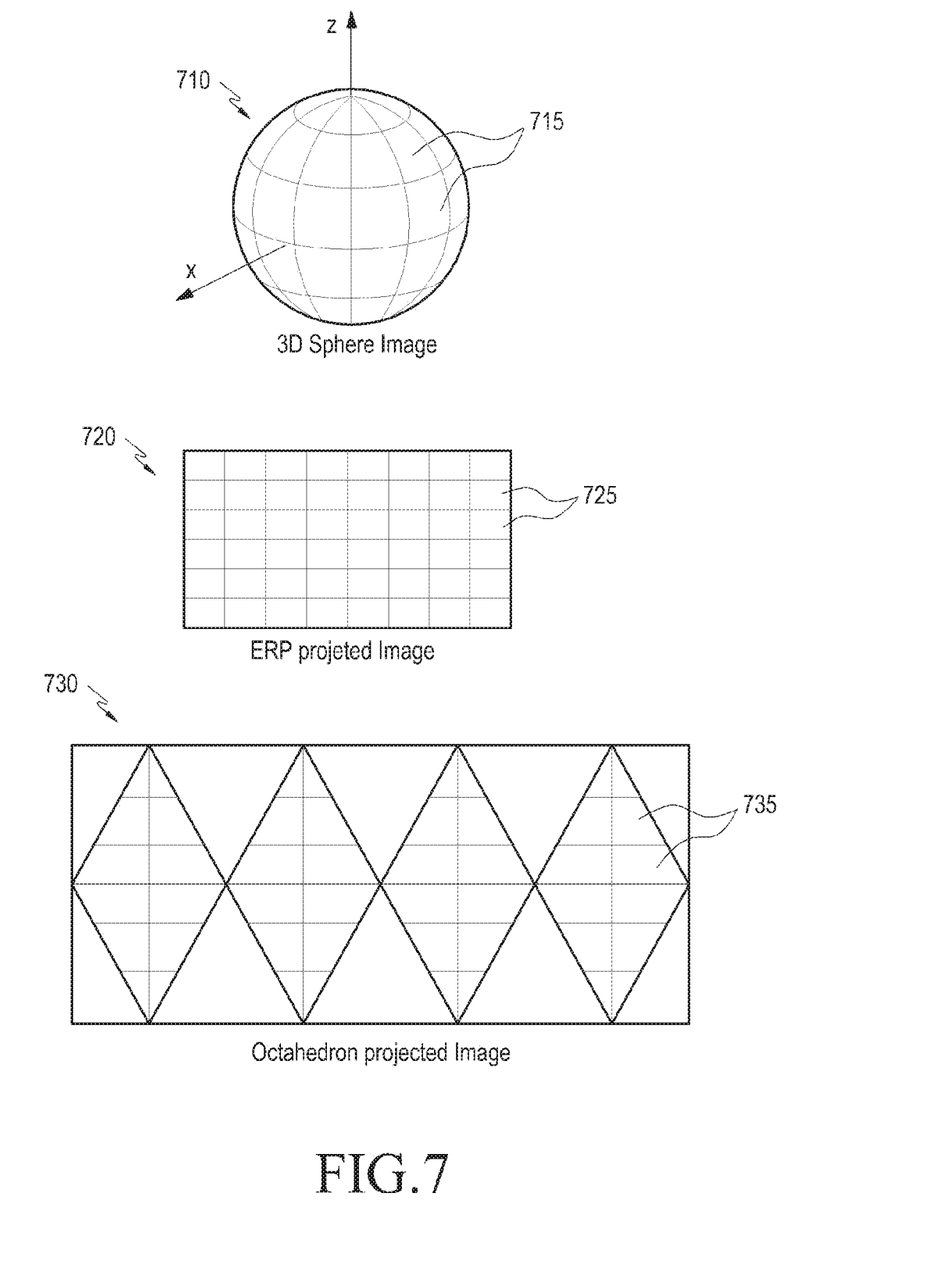
FIG. 7 illustrates a partial region of a 3D image, according to an embodiment of the present disclosure.

FIG. 7 illustrates a partial region of a 3D image according to an embodiment of the present disclosure. A spherical 3D image 710 may be split into a plurality of tiles (i.e., regions) so that the tiles have the same angular range in latitude and the same angular range in longitude. Each of the plurality of tiles may be assigned an index.

An ERP 2D image 720 generated by performing ERP on the 3D image 710 may be divided into a plurality of tiles of the ERP 2D image 720 corresponding to a plurality of tiles of the 3D image 710. The plurality of tiles of the ERP 2D image 720 may have the same size. Particular tiles 715 of the 3D image 720 may correspond to particular tiles 725 of the ERP 2D image 720.

To convert the 3D image 710 into the 2D image, octahedron projection, as well as ERP, may be used. The 2D image 730 obtained by octahedron projection may also be split into a plurality of tiles corresponding to the plurality of tiles of the 3D image 710. The plurality of tiles of the 2D image 730 obtained by octahedron projection are gradually reduced in their left-right width from the center of the image 730 to the upper or lower side while remaining constant in the upper-lower width. Particular tiles 715 of the 3D image 720 may correspond to particular tiles 735 of the octahedron projection 2D image 730.

In FIG. 7, the transmitter 110 may specify an ROI by including the index of the tile desired to be specified among the plurality of tiles in the metadata. The ROI, although specified with a single tile, may also be specified with a plurality of tiles in which case the metadata may contain a plurality of indexes corresponding to the plurality of tiles. In this case, the receiver 120 should be aware of the method for splitting the 3D image 710 into the plurality of tiles and the index number corresponding to each tile. The method for splitting the 3D image into the plurality of tiles and the index number corresponding to each tile may explicitly be delivered from the transmitter 110 to the receiver 120, or it may have already been known to the receiver 120.

In FIG. 7, the ROI specified with one or more tiles corresponding to one or more index numbers contained in the metadata may correspond to a viewport and an additional guard region.

Figure 8:
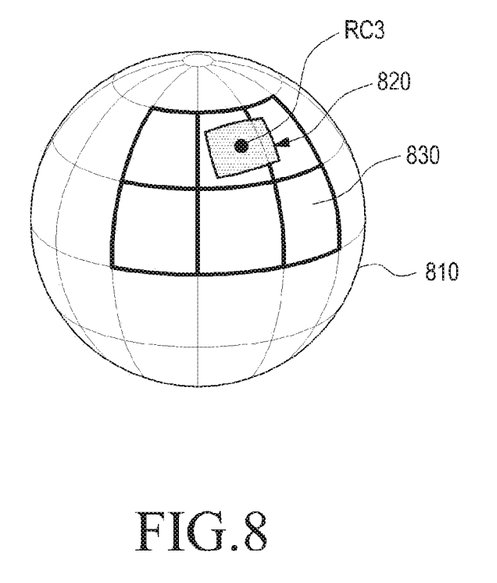
FIG. 8 illustrates a partial region of a 3D image, according to an embodiment of the present disclosure.

FIG. 8 illustrates a partial region of a 3D image, according to an embodiment of the present disclosure. A third ROI 820 and a fourth ROI 830 of a 3D image 810 may be specified through information contained in metadata in FIG. 8. The third ROI 820 is a region specifiable with four great circles as in the embodiments of FIGS. 2 and 3. Accordingly, information indicating the third ROI 820 may include the yaw, pitch, and roll of the center RC3 of the third ROI 820, and the HAR and VAR of the third ROI 820. The fourth ROI 830 may be specified through one or more indexes of one or more tiles among a plurality of tiles into which the 3D image 810 is split. Thus, the information indicating the fourth ROI 830 may include index(es) of tile(s) corresponding to the fourth ROI 830.

The third ROI 820 may correspond to a viewport. The fourth ROI 830 may cover a viewport and may include a guard region other than the viewport. Upon receiving metadata containing the information indicating the third ROI 820 and the fourth ROI 830, the receiver 120 may retrieve image information corresponding to the fourth ROI 830 from the transmitter 110 or a server and play the region corresponding to the third ROI 820.

An example format of information contained in metadata for specifying an ROI may be as follows:

```
aligned(8) class 3DROICoordinatesSampleEntry
    extends MetadataSampleEntry('roic') {
    bit(7) reserved = 0;
    unsigned int(1) sphere_tiles_flag;
    if( sphere_tiles_flag ) {
        unsigned int(16)      num_sphere_tile_columns;
        unsigned int(16)      num_sphere_tile_rows;
        bit(7) reserved = 0;
        unsigned int(1) uniform_spacing_flag;
        if( !uniform_spacing_flag ){
            for(i=0; i< num_sphere_tile_columns, i++) {
                unsigned int(16) column_width_angle;
            } for(j=0; j< num_sphere_tile_rows, j++) {
                unsigned int(16) row_height_angle;
            }
        }
    }
}
aligned(8) class 3DROICoordinatesSample( ){
    unsigned int(16) center_yaw;
    unsigned int(16) center_pitch;
    bit(7) reserved = 0;
    unsigned int(1) exact_viewport_flag;
        if( rendering_viewport_flag) {
            unsigned int(16) center_roll;
            unsigned int(16) width_great_angle;
            unsigned int(16) height_great_angle;
        }
    bit(6) reserved = 0;
    unsigned int(2) guard_region_type;
        if( guard_region_type == 1){
            unsigned int(16) delta_theta;
            unsigned int(16) delta_phi;
        } else if( guard_region_type == 2){
            unsigned in(16) num_sphere_tiles;
                for(i=0; i< num_sphere_tiles, i++) {
                    unsigned int(16) sphere_tile_column_index;
                    unsigned int(16) sphere_tile_row_index;
                {
        }
}
```

The terms in the format of information contained in metadata for specifying an ROI may be defined as follows:

sphere_tiles_flag: specifies whether sphere tiles are defined on the surface of the sphere to index guard regions or ROIs as per other parameters;

num_sphere_tile_columns: specifies the number of columns of sphere tiles into which the sphere surface containing video data is split (according to the latitude);

num_sphere_tile_rows: specifies the number of rows of sphere tiles into which the sphere surface containing video data is split (according to the longitude);

uniform_spacing_flag: in case of 1, the column boundaries and row boundaries of the sphere tiles are uniformly distributed over the regions of the sphere surface including video data; in case of 0, tile boundaries are specified by column_width_angle and row_height_angle;

column_width_angle: specifies the width corresponding to the sphere tile column on the sphere surface in degrees in the oriented angular direction defined by the longitude (θ);

row_height_angle: specifies the height corresponding to the sphere tile row on the sphere surface in degrees in the oriented angular direction defined by the latitude (φ);

center_yaw: specifies the horizontal coordinate of the center of the rendering viewport ROI as an angle in the direction defined by θ;

center_pitch: specifies the vertical coordinate of the center of the rendering viewport ROI as an angle in the direction defined by φ;

exact_viewport_flag: in case of 1, specifies that the exact rendering viewport ROI region including the orientation of the rendering viewport ROI region is signaled with center_roll, width_great_angle, and height_great_angle; in case of 0, only a point is specified as the rendering viewport ROI;

center_roll: specifies the orientation of the rendering viewport on the sphere surface as an angle (0 is the same as the horizontal orientation of the rectilinear ROI region);

width_great_angle: specifies the central angle corresponding to the width of the rectilinear ROI region related to the center of the 3D sphere or present in the great circle (This angle is present in the plane of the great circle defined with the central point of the ROI and the center of the sphere. The width of the angle passes through the center of the ROI);

height_great_angle: specifies the central angle corresponding to the height of the ROI region related to the center of the 3D sphere or present in the great circle (This angle is present in the plane of the great circle defined with the central point of the ROI and the center of the sphere. The height of the angle passes through the center of the ROI);

guard_region_type: specifies the type of guard region (or ROI) signaled with: if 0, no guard region is specified (i.e., only viewport is displayed as shown in FIGS. 2 and 3); if 1, an ERP-related guard given with delta_theta and delta_phi oriented angles is specified (i.e., a region containing a rectangular guard region is displayed on an ERP 2D image as shown in FIGS. 4 and 5); if 2, a spherical tile guard region given by signaling with spherical tile indexes corresponding to a guard region is specified (which corresponds to the embodiment of FIG. 7); and if 3, the overall active region of the 360-degree video is specified (typically displayed at a low resolution);

guard_region_type may have meanings summarized in Table 1, below, according to its values:

TABLE 1

| Value | guard_region_type |
|---|---|
| 0 | Not specified |
| 1 | ERP associated guard region |
| 2 | Sphere tile guard region |
| 3 | Whole background guard region | delta_theta: specifies the delta of the oriented angle θ defining width properties of an ERP guard region;

delta_phi: specifies the delta of the oriented angle φ defining height properties of an ERP guard region;

num_sphere_tiles: specifies the number of sphere tiles constituting a sphere tile guard region;

sphere_tile_column_index: identifies the sphere tile column index of a particular sphere tile on the sphere surface (including video data); and sphere_tile_row_index: identifies the sphere tile row index of a particular sphere tile on the sphere surface (including video data);

Where transmission of viewport-dependent video displayed through an HMD is served, a quick head motion may cause the current view point to be positioned outside a previous or current guard region. Successfully transferring and decoding image/video data positioned outside the guard region cannot be guaranteed.

To avoid garbage data outside the guard region from being displayed, two methods are disclosed herein.

A first method is to display the maximum rotation angle (yaw or pitch) of the head position per frame or per picture group. Such information needs to be delivered from a client device to display the capability or playback environment of the client in a session negotiation step. Thereafter, the server determines an actual guard region depending on the capability of the client. The maximum rotation angles (yaw and pitch) are signaled along with the guard region in a streaming file to notify in head rotation limitations or time variation limitations. The maximum rotation angles may be delivered from the server to the client to notify of the characteristics of pre-decoded VR streams.

The maximum rotation angles may be defined through the following parameters:

maximum_yaw_rotation_angle_frame: is an angle at the yaw allowed for the maximum per frame;

maximum_pitch_rotation_angle_frame: is an angle at the pitch allowed for the maximum per frame;

maximum_yaw_rotation_angle_gop: is an angle at the yaw allowed for the maximum per group of pictures; and maximum_pitch_rotation_angle_gop: is an angle at the pitch allowed for the maximum per group of pictures.

The group of pictures (GOP) represent a random access interval.

A second method to keep the display reliable for viewport-dependent delivery is to fill the blank region with a guide. The blank_region_filling_type parameter represents how to fill video data that is unavailable as per the content creator's intention or blank regions.

The blank_region_filling_type parameter is a type of texture data to fill blank regions that lack decoded image/video data. The parameter is represented in Table 2 below:

TABLE 2

| Value | blank_region_filling_type |
|---|---|
| 0x00 | Reserved |
| 0x01 | Black |
| 0x02 | Color |
| 0x03 | Static image(pre-shared) |
| 0x04 | Previous available frame |
| 0x05 | IRAP frame |
| 0x06 | Other track video |
| 0x07-0xFF | Reserved |

If blank_region_filling_type is 2, the color component values (i.e., R, G, and B) are signaled. Meanings associated with a particular value of blank_region_filling_type are as follows:

Black: a black background is displayed;

Color: a background with a particular RGB color is displayed;

Static image: a static image or graphic previously shared is rendered as background;

Previous available frame: a frame recently decoded is used as background; intra random access picture (TRAP): an IRAP-frame buffered last is used as background; and Other track video: a video from a track other than the main video track is used as background.

It is important to enable decoding only part of the entire encoded video region to provide information sufficient to display the current field of view (FOV) or viewport in viewport-dependent coding, delivery, and rendering. Video pictures are encoded in single-layer streams using temporal inter prediction (TIP). All coded bitstreams are stored in a server, and as necessary, they are transmitted to the receiver (Rx) part and all are decoded by a decoder. A region of a decoded picture corresponding to the current viewport is rendered to the user. Such a scheme is referred to as simple tile-based partial decoding.

A 360-video projection that is widely used is ERP. However, ERP provides non-uniform, asymmetrical visual quality for each projected region. Rotating geometry may lead to enhanced efficiency in encoding projected frames. Additionally, the size of the projected region corresponding to each viewport may be varied depending on the position of the viewpoint.

The size of a projected region near the equator in a 360-degree image (3D image) may be minimized while the size of a projected region near a pole is maximized in the ERP image. Where the current viewport is located near the equator, the size of the projected region is minimized, and the bit size of encoded data of the region corresponding to the current viewport is minimized. Visual degradation arising during the course of projection is also minimized near the equator.

To relocate the viewport region on or near the equator before projection, rotating the geometry of the sphere image is a very efficient way for viewport-dependent coding and delivery. By rotating the geometry, the current viewport region may always be located at the center of the ERP-projected frame. This is described in more detail with reference to FIG. 9.

Figure 9:
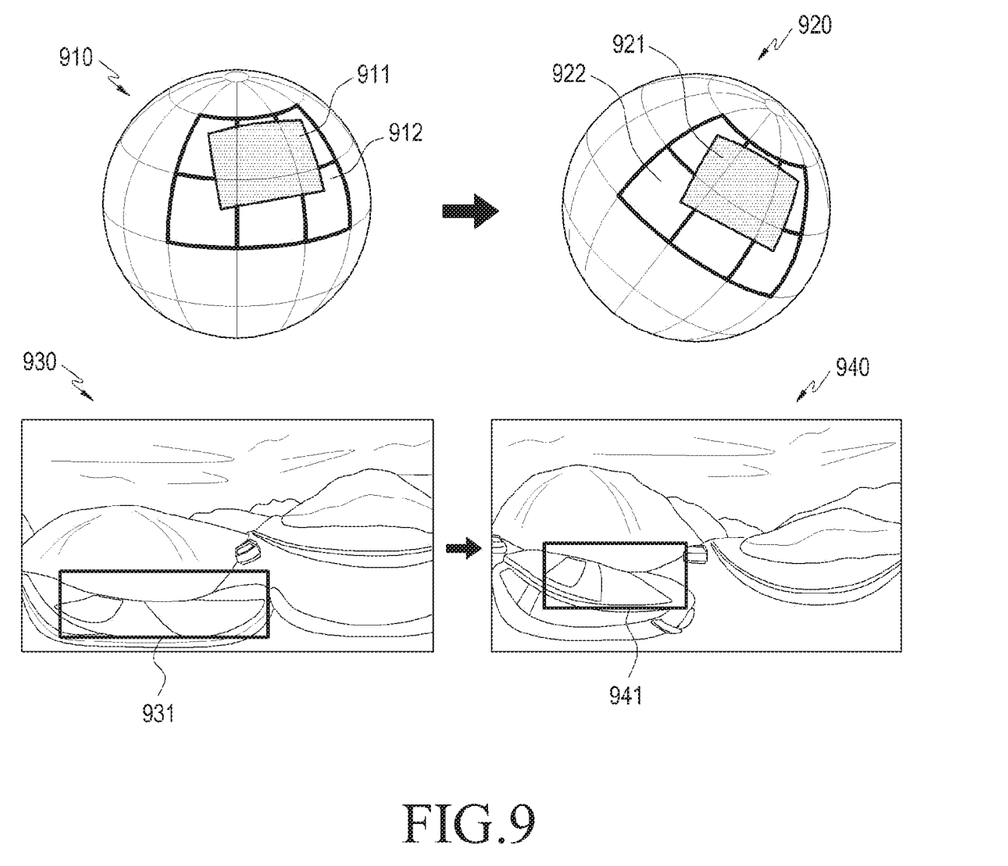
FIG. 9 illustrates a partial region of a 3D image, according to an embodiment of the present disclosure.

FIG. 9 illustrates a partial region of a 3D image, according to an embodiment of the present disclosure.

Referring to FIG. 9, a first region 911 of a spherical 3D image 910 may correspond to a viewport and a region 931 of an ERP-projected 2D image 930. To locate the first region 911 of the 3D image 910 on or near the equator, the 3D image 910 may be rotated to generate a rotated 3D image 920. The first region 911 of the 3D image 910 may correspond to a second region 921 of the rotated 3D image 920. The second region 921 of the rotated 3D image 920 may be located closer to the equator than the first region 911 of the 3D image 910. The second region 921 of the rotated 3D image 920 may correspond to a region 941 of a 2D image 940 generated by ERP-projecting the rotated 3D image 920. The region 941 is smaller in size than the region 931, and the region 941 is of a good quality and minimizes image distortions or deteriorations. The region 912 that includes a guard region, as well as the region 911 corresponding to the viewport may also be converted by rotation, similar to the region 921 located closer to the equator.

Where there is difficulty in real-time rotation and encoding of bit streams, the server may select and deliver the optimal one of multiple bit streams previously encoded with different rotation values as per the current viewport contained in feedback information from the client (i.e., dynamic bit stream switching).

A major difference from existing tile-based schemes for viewport-dependent coding and delivery is that, while the existing schemes select the projected region within the projected frame, the method of the present disclosure dynamically selects the optimal rotation so as to fix the current viewport to the center of the projected frame. The method may reduce the size of the projected region corresponding to the viewport by up to 50%. Accordingly, the total bitrate may also be drastically reduced. Geometrical rotation may be enabled at the random access point or at each frame. The format of information in the metadata to represent the 3D image rotation may be shown as follows:

```
aligned(8) class GeometryRotationParameter
    extends MetadataSampleEntry('gerp') {
    bit(7) reserved = 0;
    unsigned int(1) geometry_rotation_flag;
        if( geometry_rotation_flag ) {
            bit(7) reserved = 0;
            unsigned int(1) center_viewport_region_flag;
            if( center_viewport_region_flag ) {
                center_viewport_region_width;
                center_viewport_region_height;
        }
    geometry_rotation_yaw;
    geometry_rotation_pitch;
    geometry_rotation_roll;
        }
    }
```

The terms in the format of information in the metadata to represent the 3D image rotation may be defined as follows:

geometry_rotation_flag: specifies whether the geometry has been rotated (1) or not (0);

center_viewport_region_flag: specifies whether the current viewport is located at the centeral point of the projected frame;

center_viewport_region_width: specifies the width of the central viewport region of the projected frame;

center_viewport_region_height: specifies the height of the central viewport region of the projected frame;

geometry_rotation_yaw: specifies the geometrical rotation counter-clockwise along the Z axis;

geometry_rotation_pitch: specifies the geometrical rotation counter-clockwise along the Y axis; and geometry_rotation_roll: specifies the geometrical rotation counter-clockwise along the X axis.

Figure 10:
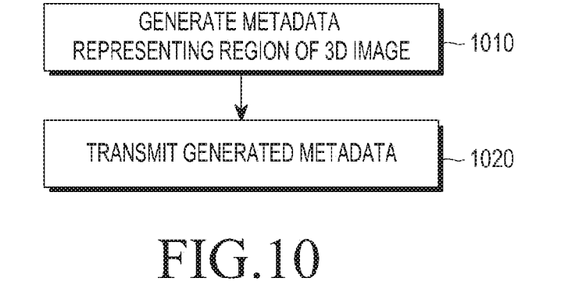
FIG. 10 is a flowchart illustrating a method for generating and transmitting metadata, according to an embodiment of the present disclosure.

FIG. 10 is a flowchart illustrating a method for generating and transmitting metadata, according to an embodiment of the present disclosure.

Referring to FIG. 10, in step 1010, a transmitter generates metadata that represents an image of a 3D image. The generated metadata may contain information for specifying a partial region of the 3D image as set forth in connection with the foregoing embodiments. The metadata may additionally contain information indicating the rotation of the 3D image. In step 1020, the transmitter transmits the generated metadata.

Figure 11:
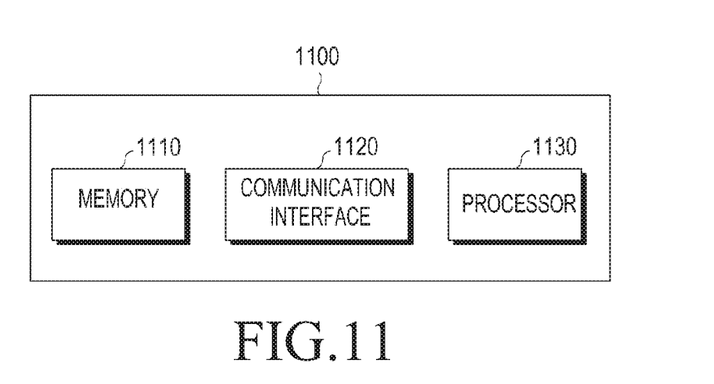
FIG. 11 is a block diagram illustrating a transmitter, according to an embodiment of the present disclosure.

FIG. 11 is a block diagram illustrating a transmitter, according to an embodiment of the present disclosure.

Referring to FIG. 11, a transmitter 1100 may also be referred to as a server. The transmitter 1100 includes a memory 1110, a communication interface 1120, and a processor 1130. The transmitter 1100 may be configured to perform the operations of the transmitter 1100 as described in connection with the above embodiments. The processor 1130 may communicably and electrically connect with the memory 1110 and the communication interface 1120, and may transmit and receive data through the communication interface 1120. The memory 1110 may store pieces of information for operations of the transmitter 1100, commands or codes for controlling the processor 1130, and transitory or non-transitory data necessary for the operation of the processor 1130. The processor 1130 may be configured to control the operation of the transmitter 1100, and the above-described operations of the transmitter 1100 may be processed and executed substantially by the processor 1130. Although transmission or reception of signals is performed through the communication interface 1120, and storage of data and commands is carried out by the memory 1110, the operations of the communication interface 1120 and the memory 1110 may be controlled by the processor 1130, and thus, the transmission and reception of signals and storage of data and commands may also be deemed to be performed by the processor 1130.

Figure 12:
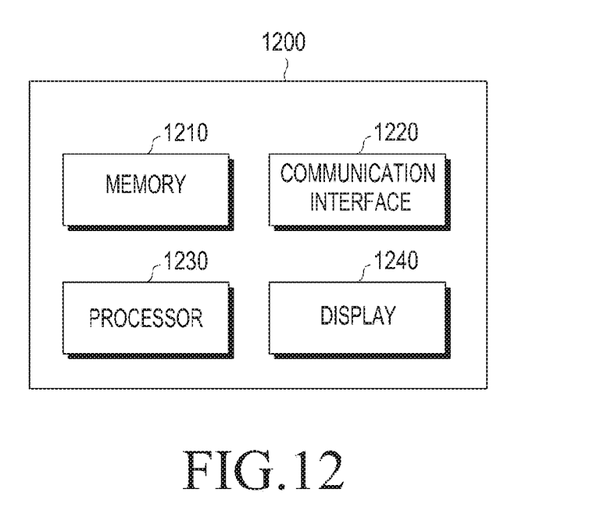
FIG. 12 is a block diagram illustrating a receiver, according to an embodiment of the present disclosure.

FIG. 12 is a block diagram illustrating a receiver, according to an embodiment of the present disclosure.

Referring to FIG. 12, a receiver 1200 may be a VR device (e.g., an HMD). The receiver 1200 may receive data regarding a 3D image (e.g., data regarding an image projected in 2D) and display the 3D image based on information contained in the metadata. The receiver 1200 includes a memory 1210, a communication interface 1220, a processor 1230, and a display 1240. Substantially the same description given for the memory 1110, communication interface 1120, and processor 1130 of the transmitter 1100 may apply to the memory 1210, communication interface 1220, and the processor 1230. The display 1240 may play a partial region (i.e., viewport) of the 3D image. The operation of the display 1240 may also be controlled by the processor 1230.

As is apparent from the foregoing description, a partial region of a 3D image may effectively be specified by metadata.

It may also be possible to reduce image distortions and deteriorations of regions of an ERP image corresponding to a partial region of a 3D image and to reduce the size of the corresponding region, thereby decreasing the amount of data required.

While the present disclosure has been shown and described with reference to certain embodiments, it will be understood by those skilled in the art that various changes in form and details may be made therein without departing from the spirit and scope of the present disclosure, which is defined, not by the detailed description and embodiments, but by the appended claims and their equivalents.

What is claimed is:

1. A method for generating metadata for a three-dimensional (3D) image, the method comprising:
    generating metadata related to an image for a shape of a sphere; and
    transmitting the generated metadata,
    wherein the metadata includes:
        information specifying at least one sphere region on the sphere related the image,
        information indicating whether each of the at least one sphere region is specified by four great circles or by two yaw circles and two pitch circles,
        flag information specifying whether at least one horizontal angular range and at least one vertical angular range of the at least one sphere region on the sphere are unchanged for the at least one sphere region,
        information indicating a common horizontal angular range which is applied to each of the at least one sphere region if the at least one horizontal angular range and the at least one vertical angular range of the at least one sphere region are unchanged for the at least one sphere region, and
        information indicating a common vertical angular range which is applied to each of the at least one sphere region if the at least one horizontal angular range and the at least one vertical angular range of the at least one sphere region are unchanged for the at least one sphere region.

2. The method of claim 1, wherein the information specifying the at least one sphere region includes information for specifying a horizontal angular range of each of the at least one sphere region, and information for specifying a vertical angular range of each of the at least one sphere region wherein the horizontal angular range and the vertical angular range are measured through a center of each of the at least one sphere region.

3. The method of claim 2, wherein the information specifying the at least one sphere region further includes information for specifying the center of each of the at least one sphere region.

4. The method of claim 1, wherein if a sphere region of the at least one sphere region corresponds to a viewport when the image is displayed, the sphere region is specified by four great circles.

5. The method of claim 1, wherein the image rendered to be shaped as a sphere is split into a plurality of tiles.

6. The method of claim 5, wherein the tiles have the same angular range in latitude and the same angular range in longitude.

7. An apparatus for generating metadata for a three-dimensional (3D) image, the apparatus comprising:
- a communication interface; and
- a processor connected with the communication interface, wherein the processor is configured to generate metadata related to an image for a shape of a sphere and transmit the generated metadata, and
- wherein the metadata includes:
- information specifying at least one sphere region on the image related to the image,
- information indicating whether each of the at least one sphere region is specified by four great circles or by two yaw circles and two pitch circles,
- flag information specifying whether at least one horizontal angular range and at least one vertical angular range of the at least one sphere region on the sphere are unchanged for the at least one sphere region,
- information indicating a common horizontal angular range which is applied to each of the at least one sphere region if the at least one horizontal angular range and the at least one vertical angular range of the at least one sphere region are unchanged for the at least one sphere region, and
- information indicating a common vertical angular range which is applied to each of the at least one sphere region if the at least one horizontal angular range and the at least one vertical angular range of the at least one sphere region are unchanged for the at least one sphere region.

8. The apparatus of claim 7, wherein the information specifying the at least one sphere region includes information for specifying a horizontal angular range of each of the at least one sphere region, and information for specifying a vertical angular range of each of the at least ones sphere region, and
   wherein the horizontal angular range and the vertical angular range are measured through a center of each of the at least one sphere region.

9. The apparatus of claim 8, wherein the information specifying the at least one sphere region further includes information for specifying the center of each of the at least one sphere region.

10. The apparatus of claim 7, wherein if a sphere region of the at least one sphere region corresponds to a viewport when the image is displayed, the sphere region is specified by four great circles.

11. The apparatus of claim 7, wherein the image rendered to be shaped as a sphere is split into a plurality of tiles.

12. The apparatus of claim 11, wherein the tiles have the same angular range in latitude and the same angular range in longitude.

\* \* \* \* \*